UNITED STATES PATENT OFFICE.

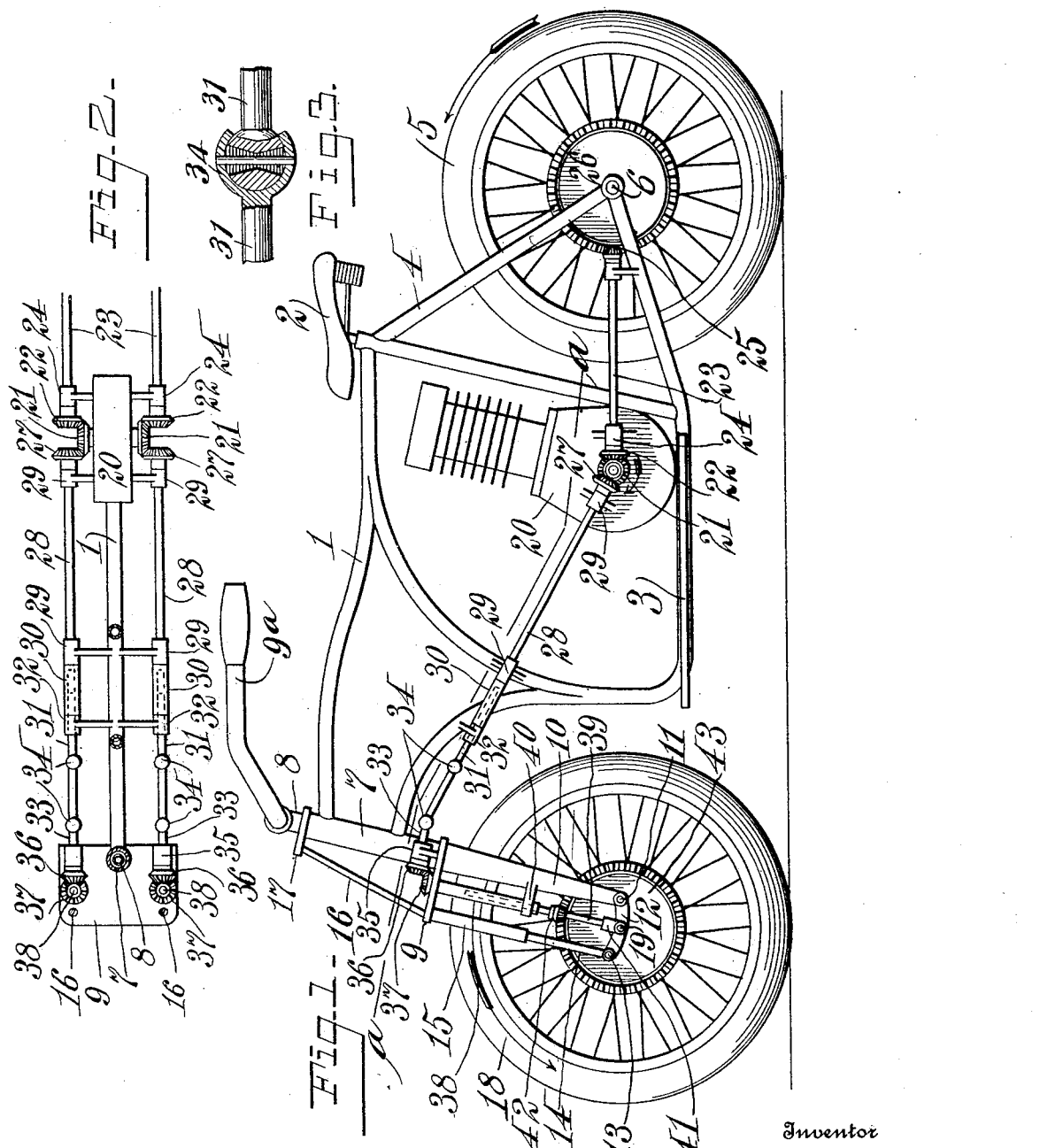

GEORGE PAMER, OF DAYTON, OHIO.

MOTOR-CYCLE.

1,107,990.　　　Specification of Letters Patent.　　Patented Aug. 18, 1914.

Application filed September 24, 1913. Serial No. 791,520.

*To all whom it may concern:*

Be it known that I, GEORGE PAMER, a subject of the King of Hungary, residing at Dayton, in the county of Montgomery and State of Ohio, have invented certain new and useful Improvements in Motor-Cycles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in driving means for motor-cycles.

The object of the invention is to provide a device of this type by means of which the front wheel of the motorcycle becomes a driving wheel in addition to the rear wheel and without affecting the steering ability of the machine.

Referring to the accompanying drawings, Figure 1 is a side elevation of a motorcycle equipped with my invention; Fig. 2 is a detailed section approximately on the line *a—a* of Fig. 1; and Fig. 3 is a detail sectional view of the universal joints.

Throughout the specification and drawings, similar reference characters indicate corresponding parts.

Referring more particularly to the drawings, 1 represents the frame of a motorcycle which is provided with the usual saddle 2 and foot board 3. The frame 1 extends rearwardly in the form of rear forks 4 to which the rear wheel 5 is attached by means of an axle 6 in a well known manner. The said frame is provided with a head 7 in which the steering shaft 8 is journaled and from which extends the handle bars 9ª. Mounted on the lower end of the shaft 8 below the head 7 is a crown 9 from which downwardly extend forks 10. Pivoted at 11 to the lower ends of the forks 10 are ends of the levers 12 the other ends of which are pivoted at 13 to plungers 14. The plungers 14 extend into tubes 15 and are under the control of springs (not shown) within the tubes thereby providing a cushion for the forward end of the machine in a well known manner. The tubes 15 extend from the crown 9 on opposite sides of the front wheel 18. The crown is provided with braces 16 which extend between said crown and a plate 17 attached to the shaft 8 above the head. The front wheel is mounted between the front forks 10 and the tubes 15 and upon a front axle 19 which is attached to the levers 12 at intermediate points.

While in the drawings and specification I have shown and described a particular type of motorcycle, I wish it to be understood that the invention may be applied to any type of machine.

Mounted on the frame 1 by any suitable means is a motor 20 which may be provided with the usual fuel tank, sparking and controlling devices, and lubricator which are not shown, being well known elements. The said motor is provided with bevel gears 21 on each side thereof, the driving mechanism being provided in duplicate. In mesh with said gears 21 are similar gears 22 on shafts 23 journaled in bearings 24 extending from the forks 4 and motor 20. Mounted on the ends of the shafts 23 opposite the gears 22 are bevel gears 25 in mesh with gears 26 attached to the rear wheel 5. By means of this train of gearing the rear wheel 5 is driven from the motor. The front wheel 18 is also driven from the motor by the following means. In addition to the gears 22 the gears 21 also mesh with similar gears 27 on the lower end of shafts 28 journaled in bearings 29 extending from the frame and motor. The shafts 28 are connected by means of telescopic members 30 with shafts 31 journaled in bearings 32 extending from the frame. The shafts 31 are connected to forward shafts 33 by means of universal joints 34 which may be of any well known type. The shafts 33 are also journaled in bearings 35 attached to the crown 9 and are provided with bevel gears 36 in mesh with bevel gears 37 mounted on the upper ends of the tubular shafts 38 journaled at their upper ends in the crown 9. The tubular shafts 38 extend downward on each side of the wheel 18 and receive shafts 39 to which they are splined. The lower ends of the tubular shafts 38 are journaled in bearings 40 extending from the forks 10 while the lower ends of the shafts 39 are journaled in a foot bearing 41 pivotally attached to the ends of the front axle 19 adjacent to the lever 12. The shafts 39 are provided with bevel gears 42 which are in mesh with bevel gears 43 attached to the front wheel and through the agency of which the front wheel is driven from the motor 20. Through the above means the front wheel of the motorcycle becomes a driver or tractor which results in a greater amount of the power of the motor being utilized in driving the machine. The driving means being provided in duplicate, it is more efficient and the connection with the front wheel will not have a tendency to rotate the steering shaft 8. The front wheel, therefore, may be turned to the right or left by the handle bars 9ª easily and without interference with the driving mechanism. It will also be noted that the means for mounting the shafts 39 including the bars 41 permit the front wheel to be mounted on the cushion thereby providing for the easy riding qualities of the machine.

Having described my invention, I claim.

1. In a device of the type specified, the combination with a frame, a front fork pivotally attached to said frame, and front and rear wheels mounted in said front fork and frame, of a gear mounted on said front wheel, a drive shaft on the frame, and telescopic and universal joint driving connections between the drive shaft and the gear on the front wheel.

2. In a device of the type specified, the combination with a frame, a front fork pivotally attached to said frame, and front and rear wheels mounted on said front fork and frame, of gears mounted on said front wheel, a drive shaft on said frame, shafts geared to said gears and journaled on said front fork, and universal and telescopic connections geared to the drive shaft and to said first named shafts whereby said front wheel is driven from the drive shaft without interfering with a free turning of said fork.

3. In a device of the type specified, the combination with the front fork, of levers mounted on said fork, cushion members mounted on said fork and connected to said levers, an axle connected with said levers, and a wheel mounted on said axle, of a telescopic shaft journaled on said fork, geared connections between said shaft and wheel, means for driving said shaft, and end bearings mounted on said levers adjacent to said axle and forming a bearing for the lower end of said telescopic shaft whereby said wheel may be driven from said shaft and be permitted to move relatively to said fork under the influence of said cushion members.

In testimony whereof I affix my signature, in presence of two witnesses.

GEORGE PAMER.

Witnesses:
 ELIZABETH SHALL,
 R. J. McCARTY.

---

Copies of this patent may be obtained for five cents each, by addressing the "Commissioner of Patents, Washington, D. C."